US012651442B1

(12) United States Patent
Shoeb et al.

(10) Patent No.:     US 12,651,442 B1
(45) Date of Patent:          Jun. 9, 2026

(54) TRAINING UAV NEURAL NETWORKS FOR OPERATION IN NEW GEOGRAPHICAL REGIONS

(71) Applicant: WING AVIATION LLC, Mountain View, CA (US)

(72) Inventors: Ali Shoeb, San Rafael, CA (US); Kyle Krafka, Los Altos, CA (US)

(73) Assignee: Wing Aviation LLC, Palo Alto, CA (US)

( * ) Notice: Subject to any disclaimer, the term of this patent is extended or adjusted under 35 U.S.C. 154(b) by 295 days.

(21) Appl. No.: 18/611,461

(22) Filed: Mar. 20, 2024

(51) Int. Cl.
　　　*G06V 10/774*　　　(2022.01)
　　　*G06T 11/10*　　　(2026.01)
　　　　　　　(Continued)

(52) U.S. Cl.
　　　CPC .......... *G06V 10/7747* (2022.01); *G06T 11/10* (2026.01); *G06V 10/82* (2022.01); *G06V 20/17* (2022.01); *G06V 20/70* (2022.01)

(58) Field of Classification Search
　　　CPC .... G06V 10/7747; G06V 10/82; G06V 20/17; G06V 20/70; G06V 10/454; G06V 10/54; G06V 10/7764; G06V 10/774; G06V 10/84; G06V 20/41; G06V 30/18057; G06V 20/698; G06V 30/19173; G06V 30/194; G06T 11/10; G06T 3/4046; G06T 5/60; G06T 9/002; G06T 2207/20076; G06T 2207/20081; G06T 2207/20084; G06T 2211/441; G06T 2207/10032; G06T 7/00; G06T 7/74; G06T 7/0002; G06T 7/0004; G06T 2207/30188; G06T 2207/30184; G06T 2207/30212; G06T 2207/30232; G06N 3/02; G06N 3/08-088; G06N 3/04;
　　　　　　　(Continued)

(56) References Cited

U.S. PATENT DOCUMENTS

2023/0192291 A1* 6/2023 Svolos ................... G05D 1/102
　　　　　　　　　　　　　　　　　701/3
2024/0169508 A1* 5/2024 Nayak ................... G06T 7/0002
2024/0192693 A1* 6/2024 Yaroshenko ........... G05D 1/101

FOREIGN PATENT DOCUMENTS

CN　　　113239936 A　*　8/2021　.......... G06F 18/214
CN　　　116710943 A　*　9/2023　.............. G08G 5/32

OTHER PUBLICATIONS

Gatys et al., "A Neural Algorithm of Artistic Style," arXiv: 1508.06576v2 [cs.CV] Sep. 2, 2015, 16 pages.
(Continued)

*Primary Examiner* — Jose L Couso
(74) *Attorney, Agent, or Firm* — Christensen O'Connor Johnson Kindness PLLC

(57)　　　　　　　ABSTRACT

A technique for provisioning UAVs to operate in a specific geographical region includes acquiring reference aerial images of the specific geographical region from a secondary source. The reference aerial images have at least one style characteristic that is distinct from that of operational aerial images acquired by the UAVs during operation. The reference aerial images are transformed into training images that adopt a style of the operational aerial images using a neural style transfer. A neural network that facilitates vision-based navigation of the UAVs is trained using the training images. The neural network is trained to operate in the specific geographical region prior to operation in the specific geographical region.

21 Claims, 7 Drawing Sheets

(51) Int. Cl.
G06V 10/82 (2022.01)
G06V 20/17 (2022.01)
G06V 20/70 (2022.01)

(58) Field of Classification Search
CPC .. G06N 3/0445; G06N 3/0454; G06N 3/0464;
G06N 3/4046; G06N 3/4053; G06N
3/049; G06N 3/0499; G06N 7/00; G06N
7/01; G06N 20/00; G06K 7/1482; G06F
18/213; G06F 18/214; G06F 18/22; G06F
18/241; G06F 18/24; G06F 18/2411;
G06F 18/2415; G06F 18/253; G06F
30/27; G06F 16/29; Y10S 128/925; H04N
2013/0092; B64C 39/024; B64U 2201/30;
B64U 2201/60; B64U 2201/20; B64U
2201/10; B64U 2201/31; B64U 10/00;
G05D 1/101; G05D 1/2435; G05D 1/46;
G05D 2201/20; G05D 2205/285; G05D
1/12; G05D 1/225; G05D 1/689; G05D
1/622; G05D 2109/20
See application file for complete search history.

(56)                    References Cited

OTHER PUBLICATIONS

Rachel Gordon, "Drones navigate unseen environments with liquid neural networks," MTI News, Massachusetts Institute of Technology, Apr. 19, 2023, 5 pages.
Neural style transfer, TensorFlow Core, Retrieved on Feb. 15, 2024 from <https://www.tensorflow.org/tutorials/generative/style_transfer> 16 pages.
Neural style transfer, Wikipedia, The Free Encyclopedia, Prior to Mar. 20, 2024, 3 pages, Retrieved from: <https://en.wikipedia.org/w/index.php?title=Neural_style_transfer&oldid=1142555294>.
Karatzoglidi et al., "Neural Style Transfer for Remote Sensing," Prior to Mar. 20, 2024, 5 pages, Retrieved from: <https://arxiv.org/abs/2007.15920>.
Zhu et al., "Unpaired Image-to-Image Translation using Cycle-Consistent Adversarial Networks," Berkeley AI Research (BAIR) laboratory, UC Berkeley, arXiv:1703.10593v7 [cs.CV] Aug. 24, 2020, 18 pages.
Christophe et al., "Neural map style transfer exploration with GANs," International Journal of Cartography, Published online: Feb. 13, 2022, vol. 8, No. 1, pp. 18-36 <https://doi.org/10.1080/23729333.2022.2031554>.

* cited by examiner

TRAINING UAV NEURAL NETWORKS FOR OPERATION IN NEW GEOGRAPHICAL REGIONS

TECHNICAL FIELD

This disclosure relates generally to unmanned aerial vehicles (UAVs), and in particular but not exclusively, relates to training neural networks of UAVs.

BACKGROUND INFORMATION

An unmanned vehicle, which may also be referred to as an autonomous vehicle, is a vehicle capable of traveling without a physically present human operator. Various types of unmanned vehicles exist for various different environments. For instance, unmanned vehicles exist for operation in the air, on the ground, underwater, and in space. Unmanned vehicles also exist for hybrid operations in which multi-environment operation is possible. Unmanned vehicles may be provisioned to perform various different missions, including payload delivery, exploration/reconnaissance, imaging, public safety, surveillance, or otherwise. The mission definition will often dictate a type of specialized equipment and/or configuration of the unmanned vehicle.

Unmanned aerial vehicles (also referred to as drones) can be adapted for package delivery missions to provide an aerial delivery service. One type of unmanned aerial vehicle (UAV) is a vertical takeoff and landing (VTOL) UAV. VTOL UAVs are particularly well-suited for package delivery missions. The VTOL capability enables a UAV to takeoff and land within a small footprint thereby providing package pick-ups and deliveries almost anywhere. To safely deliver packages in a variety of environments (particularly new environments of first impression), UAVs should be capable of accurately identifying obstacles using vision-based navigation techniques to ensure safe operating margins are respected.

The training of neural networks that facility vision-based navigation in anticipation of deployment of a UAV delivery service into a new environment can present a chicken-and-egg dilemma. Training neural networks requires large volumes of high quality, relevant data. However, acquisition of this training data is conventionally not available until after the UAVs are already operating in the new environment and capable of acquiring mission logs themselves. Generation of high quality, relevant data prior to deployment of UAVs into a new environment could increase confidence and safety margins on day one of deployments.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Figure 1:
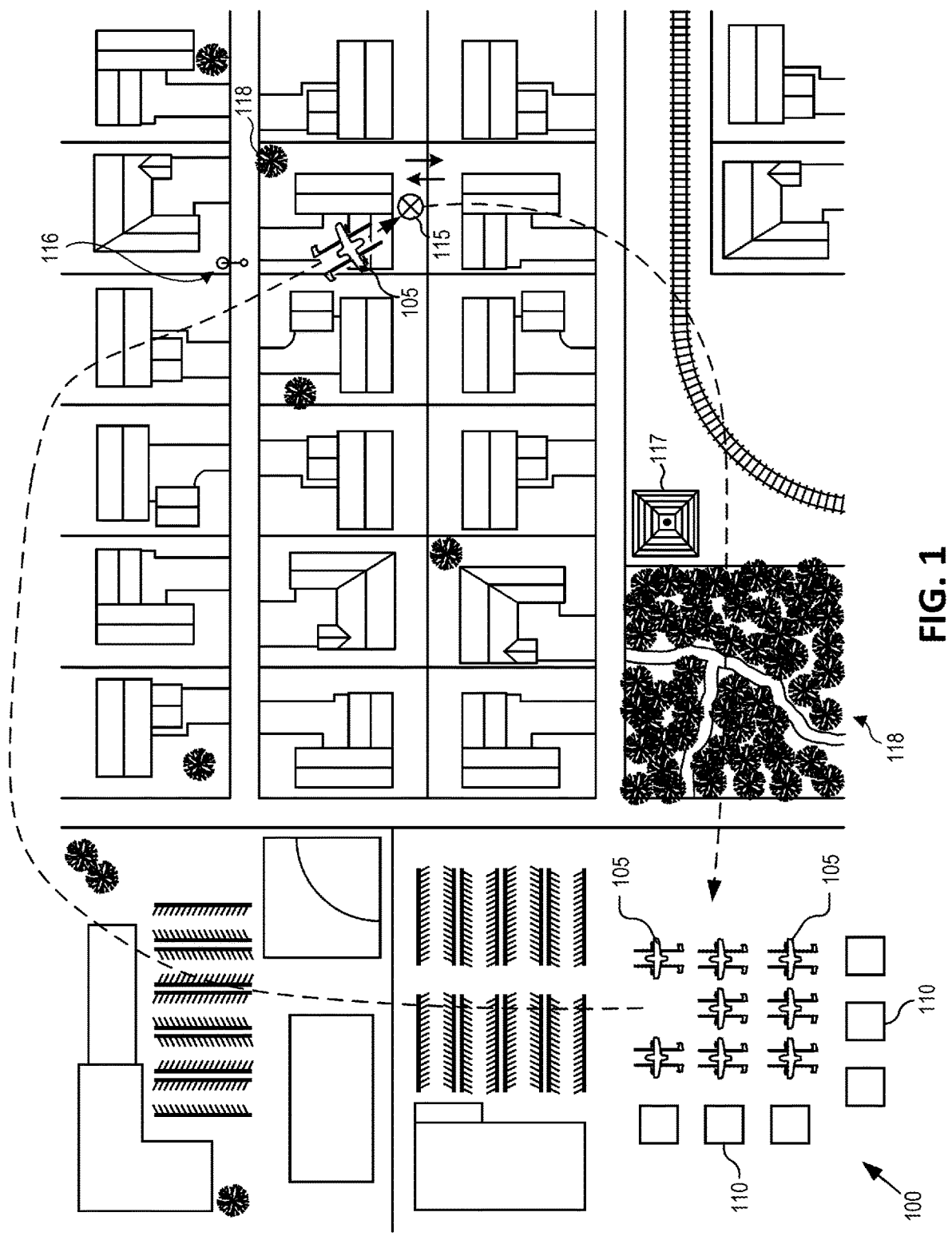
FIG. 1 illustrates operation of an unmanned aerial vehicle (UAV) delivery service that delivers packages into a neighborhood, in accordance with an embodiment of the disclosure.

Embodiments of an apparatus, system, and method of operation for provisioning unmanned aerial vehicles (UAVs) to operate in a specific geographical region are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

High quality, relevant training data is important for effective training of neural networks. This is doubly true when the neural networks implement a safety mechanism, such as vision-based navigation (e.g., visual detection and avoidance of ground-based obstacles, vision-based orientation & localization, etc.) for UAVs of a UAV service. One such service is a UAV delivery service that delivers small packages into a specific geographical region, such as a suburban neighborhood.

The highest quality and most relevant training data is the aerial images and perception sensor data acquired by the UAVs themselves during regular operations of the UAV delivery service in the specific geographical region of interest. The onboard camera systems, perception sensors, flight dynamics, altitudes, speeds, and illuminators of the specific UAVs performing their routine duties will all cause the aerial images and sensor data to have stylistic characteristics. Similarly, the objects on the ground (e.g., trees, roads, buildings, etc.) in the specific geographical region will also have certain characteristics that may deviate from other geographical regions. For example, a UAV delivery service may be preparing to expand its services into a new neighborhood, city, or country. In preparation for this expansion, the onboard neural networks that facilitate vision-based navigation may need to be retrained or otherwise refined to improve recognition of objects (e.g., trees, roads, buildings, streetlights, utility poles, etc.) that may be unique to the new geographical region or otherwise not previously encountered by the UAV service. To illustrate, if a UAV delivery service had only previously delivered packages in a region having evergreen trees, bungalow homes, and narrow roads, the semantic segmentation model responsible for identifying trees, buildings, and roads may be less effective when initially deployed into an environment primarily populated with deciduous trees, multistory buildings, and multilane highways.

Training data acquired by the UAVs themselves of a particular UAV service is referred to herein as primary source training data while training data acquired from other sources is referred to as secondary source training data. As mentioned, primary source training data of a specific geographical region will often be of the highest quality and most relevant for training neural networks to operate on the given UAVs in the specific geographical region. However, when expanding operations of the UAV service into a new geographical region, or region of first impression, primary source training data may not be available, or available in sufficient quantity.

Embodiments disclosed herein describe techniques for generating high quality, relevant training data (including training images and/or training sensor data) for training neural networks that facilitate vision-based navigation for UAVs. In particular, the techniques enable the creation of high quality, relevant training data that mimics the style of the primary data source while also having the characteristic objects found in a specific geographic region. This training data may be generated from secondary data sources (e.g., satellite imagery, manned aviation photography, etc.) of the specific geographical region. As such, the techniques described herein enable training of neural networks, such as a semantic segmentation model, to be trained on high quality, relevant aerial images and sensor data without the benefit of prior flight missions over the specific geographical region. These techniques increase confidence and safety on day one deployments into a novel region or region of first impression for the UAV service.

FIG. 1 illustrates operation of a UAV delivery service that delivers packages into a neighborhood, in accordance with an embodiment of the disclosure. UAVs may one day routinely deliver items into urban or suburban neighborhoods from small regional or neighborhood hubs such as terminal area 100 (also referred to as a local nest or staging area). Vendor facilities that wish to take advantage of the aerial delivery service may set up adjacent to terminal area 100 (such as vendor facilities 110) or be dispersed throughout the neighborhood for waypoint package pickups (not illustrated). An example aerial delivery mission may include multiple mission phases such as takeoff from terminal area 100 with a package for delivery to a destination area 115 (also referred to as a delivery zone, drop zone, or delivery destination), rising to a cruising altitude, and cruising to the customer destination. At destination area 115, UAV 105 descends for package drop-off before once again ascending to a cruise altitude for the return cruise back to terminal area 100.

During the course of a delivery mission, ground-based obstacles are an ever-present hazard—particularly tall slender obstacles such as streetlights 116, telephone poles, radio towers 117, cranes, trees 118, etc. Some of these obstacles may be persistent unchanging obstacles (e.g., streetlights, telephone poles, radio towers, etc.) while others may be temporary (cranes, etc.), or ever changing/growing (e.g., trees). These obstacles may vary greatly in appearance, frequency, or distribution from one geographical region to the next. These ground-based obstacles may be tall enough to present a hazard during cruise flight segments enroute to-and-fro destination 115 or present an acute hazard when descending to destination 115 or ascending from destination 115. Regardless, vision-based navigation techniques for identifying and avoiding these obstacles are important and must be capable of effectively performing their function across all operating regions. Accordingly, embodiments described herein present techniques for effectively training the neural networks used for vision-based navigation of UAVs to identify these objects and obstacles even before the UAV service has had opportunities to acquire primary source training data. Although the techniques disclosed herein are described in connection with a UAV delivery service, it should be appreciated that they are equally applicable to other types of UAV services.

Figure 2:
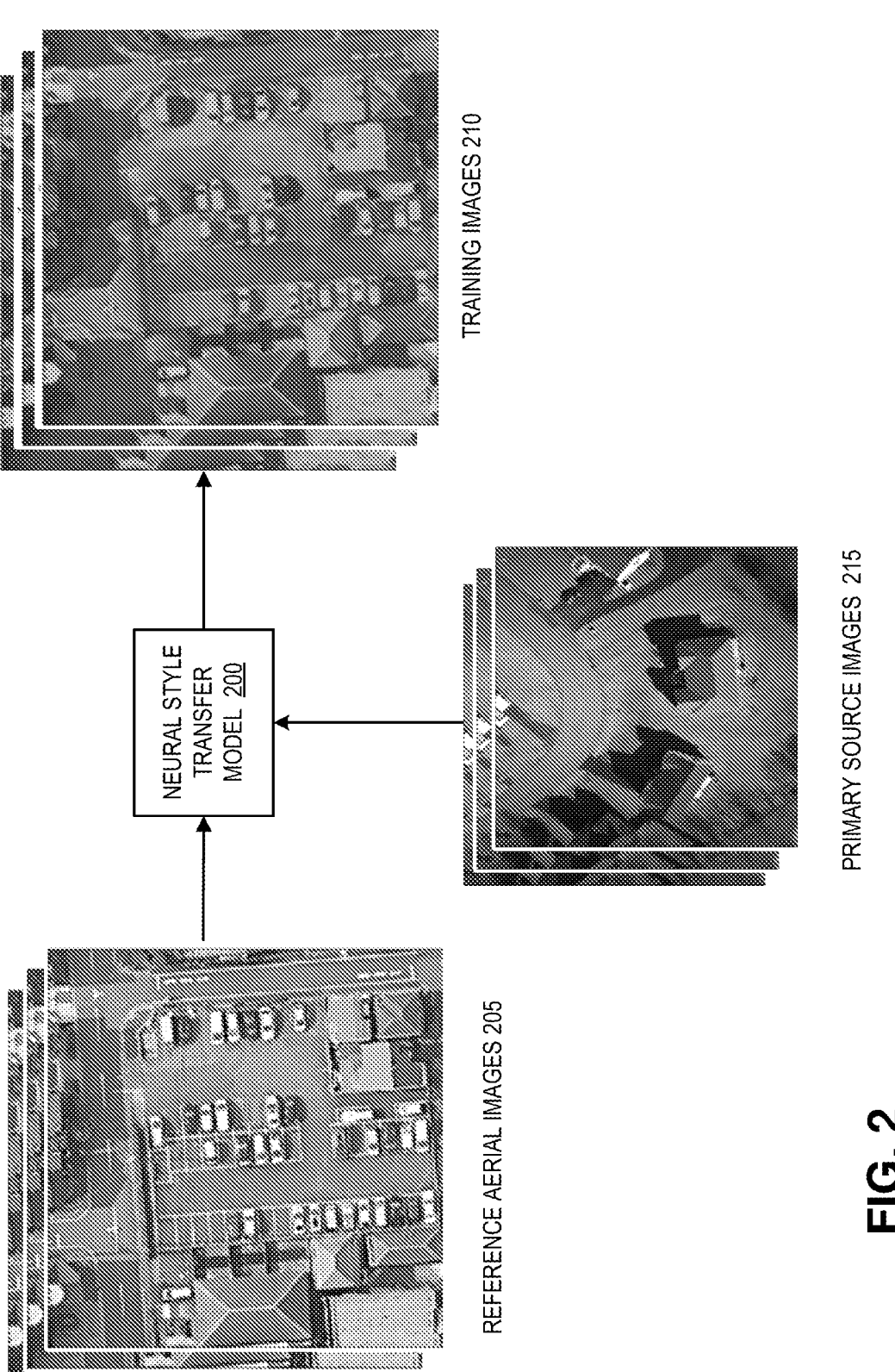
FIG. 2 illustrates operation of a neural style transfer model that transforms reference aerial images into training images that adopt an image style of primary source images of a UAV service, in accordance with an embodiment of the disclosure.

FIG. 2 illustrates operation of a neural style transfer model 200 that transforms reference aerial images 205 into training images 210 that adopt an image style of primary source images 215 of the UAV delivery service, in accordance with an embodiment of the disclosure. Reference aerial images 205 are aerial images acquired from a secondary source different than UAVs 105 of the UAV delivery service. For example, the secondary sources may include satellite imagery or manned aircraft aerial imagery. Reference aerial images 205 are tagged or otherwise annotated with ground truth data identifying noteworthy objects within the aerial images. Noteworthy objects include objects to be identified by UAVs 105 during flight missions for the purposes of localization, obstacle avoidance, general navigation, or otherwise. Specific examples of noteworthy objects within the aerial images include trees, roads, and buildings.

Reference aerial image 205 have one or more style characteristics that are distinct from primary source images 215 acquired with the onboard camera system of UAVs 105 during regular or commercial operations of the UAV delivery service. Neural style transfer model 200 is trained on primary source images 215 to learn the "image style" of primary source images 215. Once this image style is learned, neural style transfer model 200 can transform reference aerial images 205 having a different image style into training images 210 having the image content of reference aerial images 205, but recast to adopt the image style of primary source images 215. This transformation changes the reference aerial images 205 to look as though they were captured by UAVs 105. In the example of FIG. 2, training images 210 are dimmer and blurrier than reference aerial images 205. However, the transformation is not limited to image brightness and clarity/sharpness, but may include a variety of other factors as described below. This image style transformation improves the quality and relevance of training images 210, which in turn improves the training dataset used to train neural networks used on UAVs 105 for vision-based navigation.

The style characteristic differences between reference aerial images 205 and primary source images 215 can stem from a variety of factors that differ between the primary and secondary sources. These factors may include: the use of a different camera lens that produces different characteristic lens aberrations, different image sensors that produce different noise, resolution, or aliasing characteristics, different camera settings (e.g., exposure time, gain, aperture, etc.) that produce different image characteristics due to the specific camera settings, different speeds over ground (SOG) while acquiring the aerial images that result in different motion blur characteristics, different altitudes while acquiring the aerial imagery that result in different altitude perspective characteristics, different illumination profiles that result in different illumination pattern characteristics, different camera poses (e.g., point of view obliqueness) while acquiring the aerial images that result in different orthographic perspectives, etc. Neural style transfer is a class of software algorithms that manipulate digital images to adopt the appearance or visual style of selected set of images (e.g., primary source images 215) to rectify the above characteristic differences. Neural style transfer model 200 may be implemented with a deep neural network trained to perform image style transformations. Example neural style transfer algorithms include those described in *A Neural Algorithm of Artistic Style*, Leon Gatys et al., arXiv: 1508.06576 or *Unpaired Image-to-Image Translation using Cycle-Consistent Adversarial Networks*, Jun-Yan Zhu et al., arXiv: 1703.10593.

In one embodiment, the concept of neural style transfer need not be limited to aerial imagery. Rather, neural style transfer can also be extended to other perception sensor data. For example, synthetic training data is often generated and used to train neural networks. In the context of training neural networks for UAVs 105, simulated environments along with simulated flight missions and mission logs may be created to produce additional training data. The simulated flight will create simulated perception sensor data such as stereovision depth maps, inertial measurement unit (IMU) data, airspeed data, barometer data, global navigation satellite system (GNSS) data etc. When this data is created from simulations, it can often be too perfect and not include the noise or random variations found in real world sensor data. Accordingly, a neural style transfer may also be applied to simulated sensor data to transform the simulated sensor data into the sensor style of perception sensors onboard UAVs 105.

Figure 3:
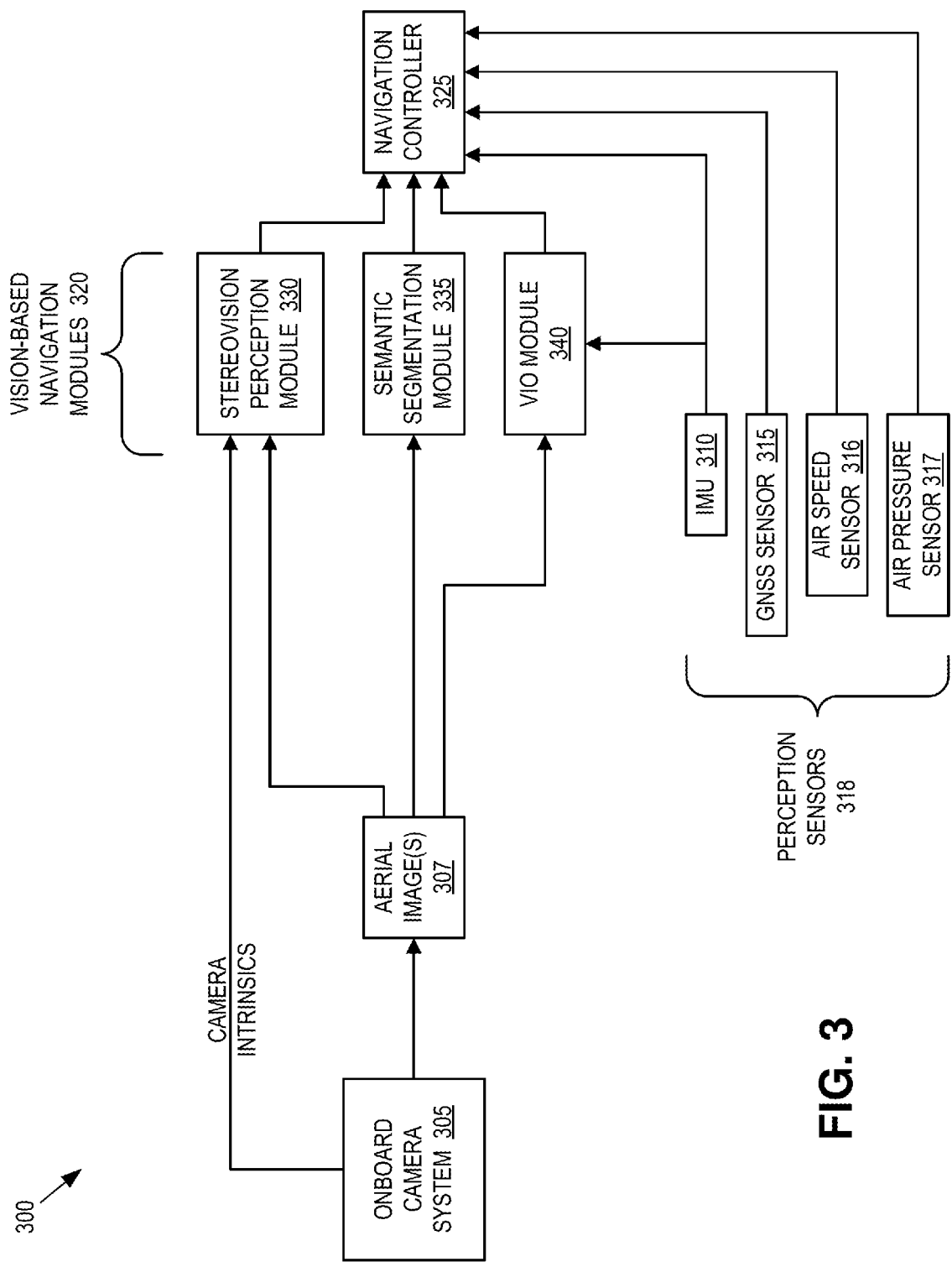
FIG. 3 is a functional block diagram illustrating a system for vision-based navigation of UAVs, in accordance with an embodiment of the disclosure.

FIG. 3 is a functional block diagram illustrating a system 300 for vision-based navigation of UAVs, in accordance with an embodiment of the disclosure. System 300 includes many of the relevant software and hardware elements onboard UAVs 105 for implementing vision-based navigation. The illustrated embodiment of system 300 includes an onboard camera system 305 for acquiring aerial images 307, an IMU 310, a GNSS sensor 315, an air speed sensor 316 (e.g., pitot tube), an air pressure sensor 317 (e.g., barometer), visual tracking modules 320, and a navigation controller 325. Collectively, the sensors 310-317 are referred to as perception sensors 318. The illustrated embodiment of visual tracking modules 320 includes a stereovision perception module 330, a semantic segmentation module 335, and a visual inertial odometry (VIO) module 340.

Onboard camera system 305 is disposed on UAVs 105 with a downward looking position to acquire aerial images 307, which are primary source images. Aerial images 307 may be acquired at a regular video frame rate (e.g., 20 f/s, 30 f/s, etc.) and a subset of the images provided to the various visual tracking modules 320 for analysis. In one embodiment, onboard camera system 305 is a stereovision camera system. While capturing aerial images 307, the camera intrinsics along with sensor readings from the onboard perception sensors may be recorded and indexed to aerial images 307. For example, IMU 310 may include one or more of an accelerometer, a gyroscope, or a magnetometer to capture accelerations (linear or rotational), attitude, and heading readings. GNSS sensor 315 may be a global positioning system (GPS) sensor, or otherwise, and output longitude/latitude position, mean sea level (MSL) altitude, heading, speed over ground (SOG), etc. Air speed sensor 316 captures air speed of UAV 105 while underway, which may serve as a rough approximation for SOG when adjusted for weather conditions. Barometer 317 measures air pressure, which provides MSL altitude, which may be offset using elevation map data to estimate above ground level (AGL) altitude.

During flight missions, visual tracking modules 320 are operated as part of the onboard machine vision system and may constantly receive aerial images 307 and identify objects represented in those aerial images. Stereovision perception module 330 analyzes parallax between stereovision aerial images acquired by onboard camera system 305 to estimate distance to pixels/features/objects in aerial images 307. These stereovision depth estimates may be referred to as a stereovision depth map. VIO module 340 estimates the three-dimensional (3D) pose (e.g., position/orientation) of onboard camera system 305 of UAV 105 using aerial images 307 and IMU 310. In other words, VIO module 304 provides ego-motion tracking relative to the surrounding environment of UAV 105. Semantic segmentation module 335 uses image segmentation to inform object detection/identification and feature tracking within aerial images 307. Feature tracking includes the identification and tracking of features within aerial images 307. Features may include edges, corners, high contrast points, etc. of objects within aerial images 307. Recognized objects may be tracked and the identifications provided to other modules responsible for making real-time flight decisions. Collectively, visual tracking modules 320 provide vision-based analysis and understanding of the surrounding environment, which may be used by navigation controller 325 to inform navigation decisions and perform localization, automated obstacle avoidance, route traversal, etc. Of course, the output from the visual tracking modules 320 may be combined with, or considered in connection with, real-time data from IMU 310, GNSS sensor 315, airspeed sensor 316, and air pressure sensor 317 by navigation controller 325 to make informed vision-based navigation decisions.

Figure 4A:
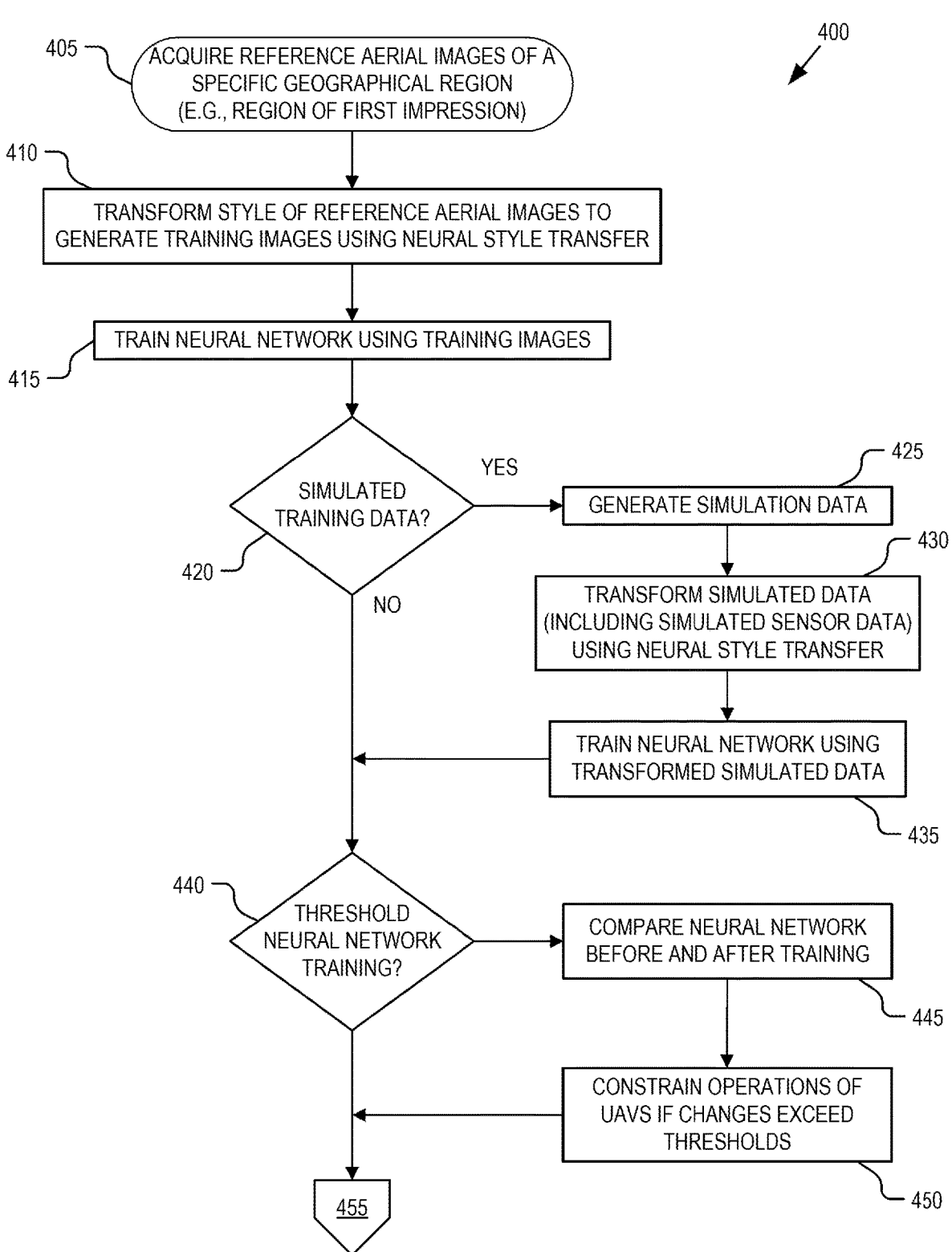
FIGS. 4A & 4B include a flow chart illustrating a process for provisioning UAVs of a UAV service to operate in a specific geographical region, in accordance with an embodiment of the disclosure.
Figure 4B:
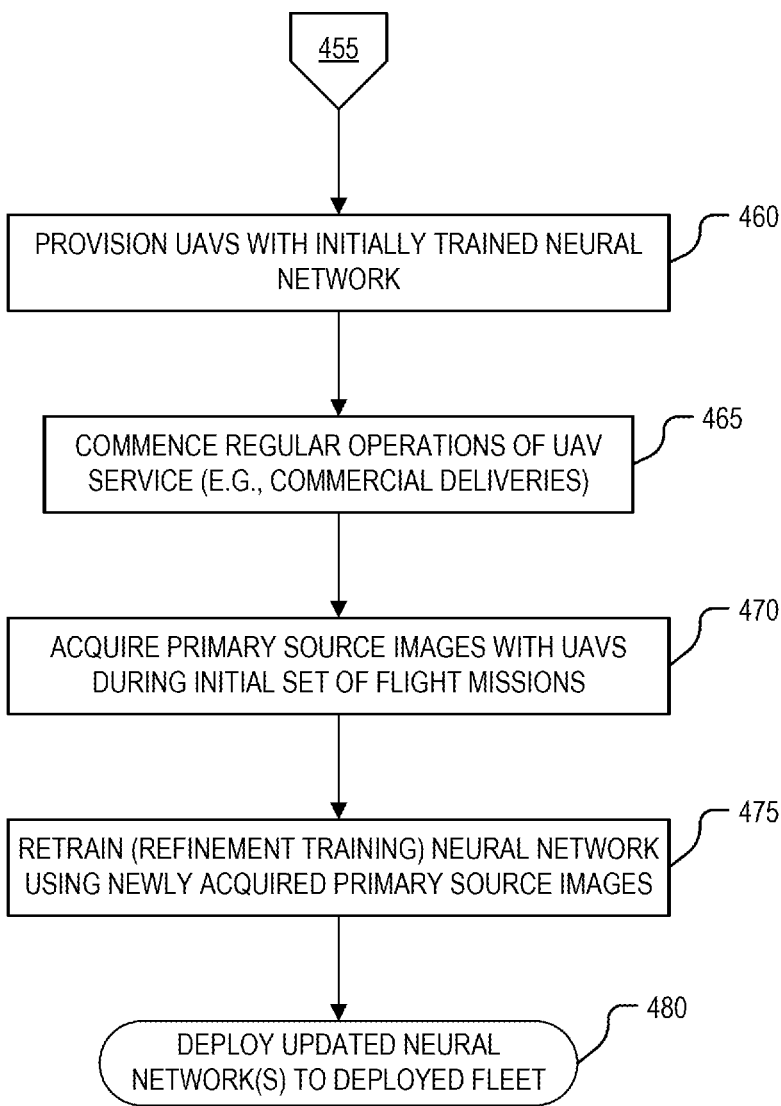

FIGS. 4A & 4B are a flow chart illustrating a process 400 for provisioning UAVs 105 of a UAV delivery service to operate in a specific geographical region, in accordance with an embodiment of the disclosure. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

In a process block 405, reference aerial images 205 capturing aerial imagery of a specific geographical region are acquired. The specific geographical region may be a new region (neighborhood, city, state, country, etc.) into which the UAV delivery service is expanding. The specific geographical region may be a region of first impression for the UAV delivery service having new or unique vegetation, buildings, transportation infrastructure, etc. Reference aerial images 205 may be acquired from a variety of secondary sources including satellite imagery, manned aircraft imagery, or otherwise. However, since the specific geographical region is new for the UAV delivery service, it may only have access to secondary source imagery and limited access to primary source imagery from test or demonstration flight missions. In general, the UAV delivery service may have little to no primary source imagery from regular/commercial operations of its service. In one embodiment, reference aerial images 205 are annotated with ground truth data identifying objects relevant to vision-based navigation. Such annotated objects may include roads, buildings, trees, etc.

In general, reference aerial images 205 will have many style characteristic differences from primary source images 215 acquired by UAVs 105 during regular/commercial operations. As such, reference aerial images 205 are not ideal for training onboard neural networks such as vision-based navigation modules 320. To improve the quality and relevance of reference aerial images 205 for training purposes, reference aerial images 205 are transformed into training images 210 by neural style transfer model 200 (process block 410). This transformation retains the ground truth data and substantive objects captured in reference aerial images 205 of the specific geographical region; however, training images 210 adopt the image style of primary source images 215. This transformation increases the quality and relevance of training images 210 for training neural networks of UAVs 105 in preparation for deployment into the specific geographical region (process block 415).

In some embodiments, simulations may be used to generate synthetic/simulated training data to enlarge the pool of training data and training images (decision block 420). Simulated training data is particularly useful when availability of suitable reference aerial images 205 is limited. In a process block 425, virtual environments relevant to the specific geographical region are generated and simulated flight missions are flown to generate simulated training data. In connection with the creation of these virtual environments and simulated flight missions, both simulated images and simulated sensor data may be created. Both of the simulated images and simulated sensor data may be transformed using neural style transfer (process block 430) to obtain image data and sensor data having style characteristics that adopt, or otherwise mimic, the style characteristics of images and sensor data acquired by UAVs 105 during real operations. In process block 435, this transformed simulated sensor data and simulated images are then used to further train or refine one or more neural networks of UAVs 105 used to facilitate vision-based navigation.

In one embodiment, training of the neural network using training images 210 is a retraining or refinement training of neural networks that are already trained to operate in other geographical regions. In some of these embodiments, the refinement training is thresholded (decision block 440) to identify large changes in the neural networks from the retraining using training images 210. Large changes may indicate that differences in the new geographical region are substantial and initial operations of UAVs 105 in the new geographic region should be monitored closely. Accordingly, in a process block 445, the neural network is compared after the refinement training using training images 210 generated with neural style transfer against the neural network prior to the refinement training. The magnitude of the changes may be determined by thresholding changes in the weights and bias of the neural network. If the neural network changes greater than a threshold amount during the refinement training, then operation of UAVs 105 over the specific geographical region may be constrained (process block 450). Constraints may include limiting reliance upon the retrained neural network for vision-based navigation of UAVs 105. In one embodiment, limiting reliance may continue until after primary source training data of the specific geographical region is acquired by initial operations of UAVs 105 and used to perform further refinement training of the neural network. Accordingly, the thresholding can be used as a caution indicator for identifying specific geographical regions that may have objects or features that are substantially different than the neural networks had previously been trained to handle.

Process 400 continues to a process block 460 on FIG. 4B via off page reference 455. In process 460, UAVs 105 are provisioned with the trained/refined neural networks prior to their deployment for regular or commercial operations (process block 465). These neural networks may include vision-based navigation modules 320 including semantic segmentation module 335. During an initial set of flight missions, primary source images of the specific geographical region, along with primary source sensor data, may be collected during regular operations and extracted from mission logs (process block 470). This newly acquired primary source imagery and sensor data may be used to further train or refine the onboard neural networks (process block 475). The UAV fleet may then be updated with neural networks trained on primary source data (process block 480). After this retraining, previous constraints instituted due to threshold violations may also be lifted.

Not only may neural style transfer may be used to generate training images 210 that resemble primary source images 215, neural style transfer may also be used to generate other types of training images. For example, primary source images 215 may be initially acquired during daytime operations of the UAV service. These daytime images may be transformed by a neural style transfer model trained to generate nighttime training images from daytime operational images. This day-to-night neural style transfer may be used as a mechanism to train and prepare neural networks that facilitate vision-based navigation for nighttime operations prior to acquisition of primary source nighttime images.

Figure 5A:
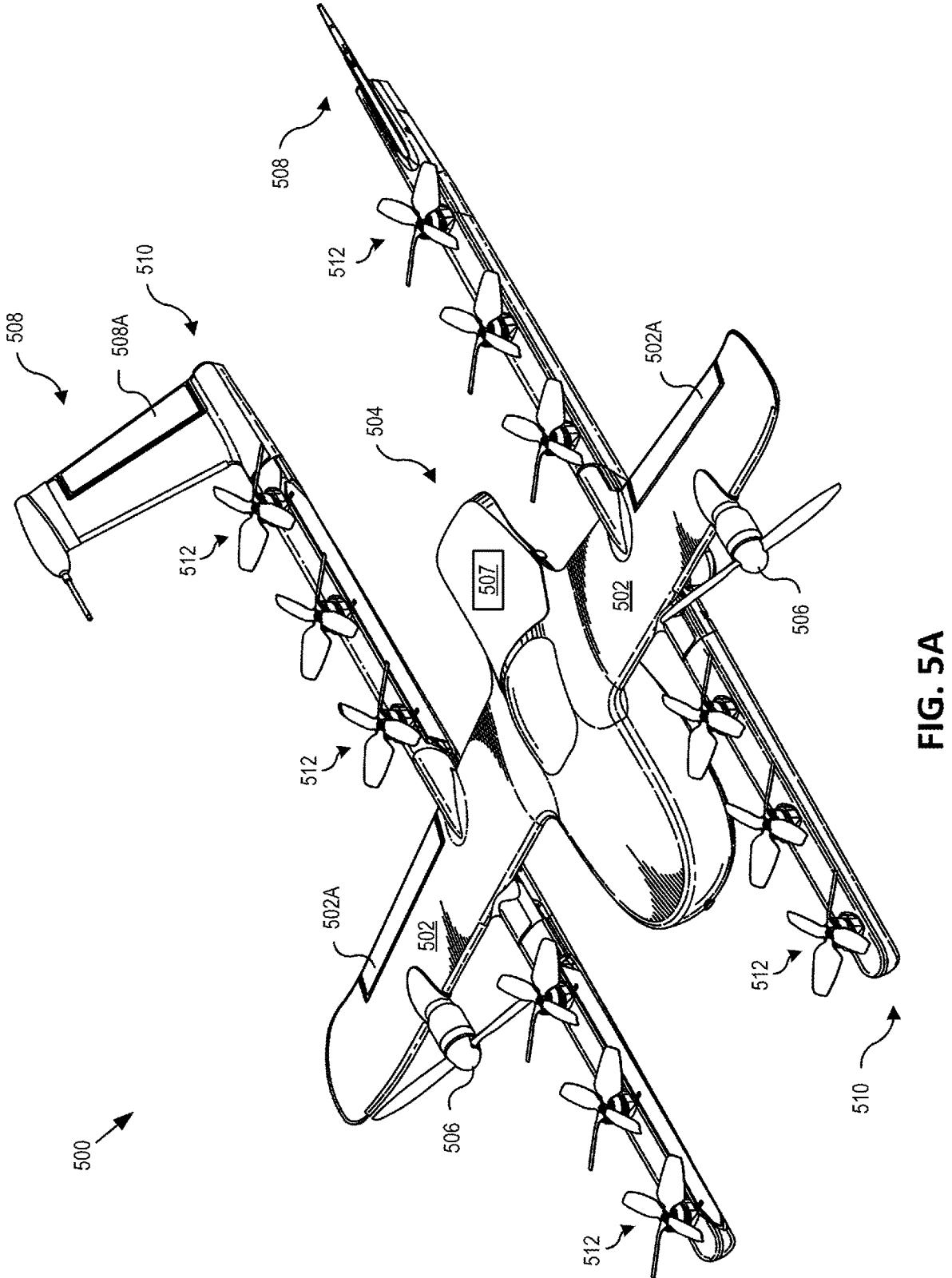
FIG. 5A is a perspective view illustration of a UAV configured for use in a UAV delivery system, in accordance with an embodiment of the disclosure.
Figure 5B:
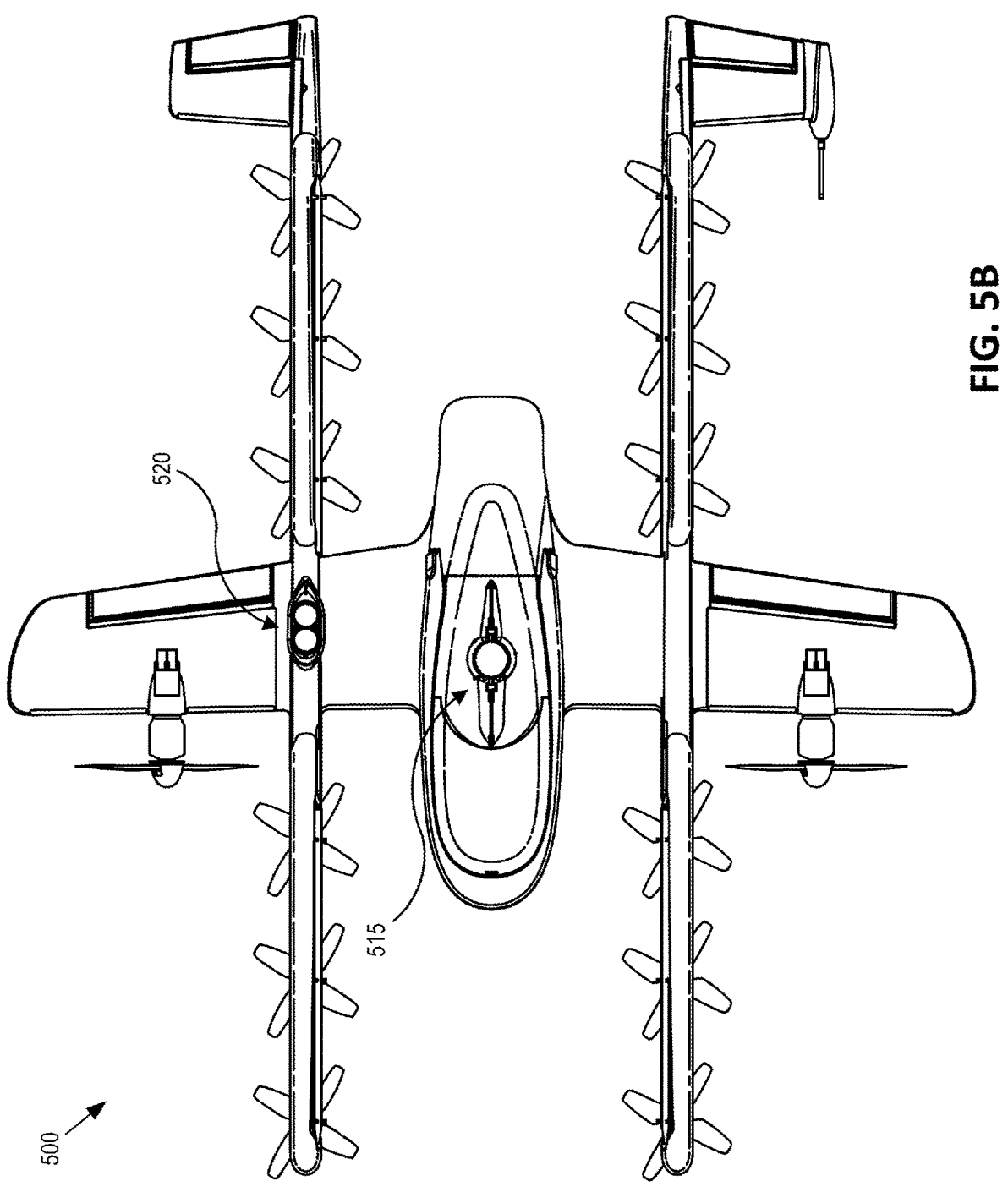
FIG. 5B is an underside plan view illustration of the UAV configured for use in the UAV delivery system, in accordance with an embodiment of the disclosure.

FIGS. 5A and 5B illustrate a UAV 500 that is well suited for delivery of packages, in accordance with an embodiment of the disclosure. FIG. 5A is a topside perspective view illustration of UAV 500 while FIG. 5B is a bottom side plan view illustration of the same. UAV 500 is one possible implementation of UAVs 105 illustrated in FIG. 1, although other types of UAVs may be implemented as well for UAV delivery services or other UAV services.

The illustrated embodiment of UAV 500 is a vertical takeoff and landing (VTOL) UAV that includes separate propulsion units 506 and 512 for providing horizontal and vertical propulsion, respectively. UAV 500 is a fixed-wing aerial vehicle, which as the name implies, has a wing assembly 502 that can generate lift based on the wing shape and the vehicle's forward airspeed when propelled horizontally by propulsion units 506. The illustrated embodiment of UAV 500 has an airframe that includes a fuselage 504 and wing assembly 502. In one embodiment, fuselage 504 is modular and includes a battery module, an avionics module, and a mission payload module. These modules are secured together to form the fuselage or main body.

The battery module (e.g., fore portion of fuselage 504) includes a cavity for housing one or more batteries for powering UAV 500. The avionics module (e.g., aft portion of fuselage 504) houses flight control circuitry of UAV 500, which may include a processor and memory, communication electronics and antennas (e.g., cellular transceiver, wifi transceiver, etc.), and various sensors (e.g., GNSS sensor, an inertial measurement unit, a magnetic compass, a radio frequency identifier reader, etc.). Collectively, these functional electronic subsystems for controlling UAV 500, communicating, and sensing the environment may be referred to as a control system 507. Control system 507 may incorporate the functional components of system 300 described in connection with FIG. 3. The mission payload module (e.g., middle portion of fuselage 504) houses equipment associated with a mission of UAV 500. For example, the mission payload module may include a payload actuator 515 (see FIG. 5B) for holding and releasing an externally attached payload (e.g., package for delivery). In some embodiments, the mission payload module may include camera/sensor equipment (e.g., camera, lenses, radar, lidar, pollution monitoring sensors, weather monitoring sensors, scanners, etc.). In FIG. 5B, an onboard camera 520 (e.g., onboard camera system 305) is mounted to the underside of UAV 500 to support a computer vision system (e.g., stereoscopic machine vision) for visual triangulation and navigation as well as operate as an optical code scanner for reading visual codes affixed to packages. These visual codes may be associated with or otherwise match to delivery missions and provide the UAV with a handle for accessing destination, delivery, and package validation information. Of course, onboard camera 520 may alternatively be integrated within fuselage 504.

As illustrated, UAV 500 includes horizontal propulsion units 506 positioned on wing assembly 502 for propelling UAV 500 horizontally. UAV 500 further includes two boom assemblies 510 that secure to wing assembly 502. Vertical propulsion units 512 are mounted to boom assemblies 510. Vertical propulsion units 512 providing vertical propulsion. Vertical propulsion units 512 may be used during a hover mode where UAV 500 is descending (e.g., to a delivery location), ascending (e.g., at initial launch or following a delivery), or maintaining a constant altitude. Stabilizers 508 (or tails) may be included with UAV 500 to control pitch and stabilize the aerial vehicle's yaw (left or right turns) during cruise. In some embodiments, during cruise mode vertical propulsion units 512 are disabled or powered low and during hover mode horizontal propulsion units 506 are disabled or powered low.

During flight, UAV 500 may control the direction and/or speed of its movement by controlling its pitch, roll, yaw, and/or altitude. Thrust from horizontal propulsion units 506 is used to control air speed. For example, the stabilizers 508 may include one or more rudders 508a for controlling the aerial vehicle's yaw, and wing assembly 502 may include elevators for controlling the aerial vehicle's pitch and/or ailerons 502a for controlling the aerial vehicle's roll. While the techniques described herein are particularly well-suited for VTOLs providing an aerial delivery service, it should be appreciated that the use of neural style transfer for training onboard neural networks of UAVs is generally applicable to a variety of aircraft types (not limited to VTOLs) providing a variety of services or serving a variety of functions beyond package deliveries.

Many variations on the illustrated fixed-wing aerial vehicle are possible. For instance, aerial vehicles with more wings (e.g., an "x-wing" configuration with four wings), are also possible. Although FIGS. 5A and 5B illustrate one wing assembly 502, two boom assemblies 510, two horizontal propulsion units 506, and six vertical propulsion units 512 per boom assembly 510, it should be appreciated that other variants of UAV 500 may be implemented with more or less of these components.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method for provisioning unmanned aerial vehicles (UAVs) of a UAV service to operate in a specific geographical region, the method comprising:

acquiring reference aerial images of the specific geographical region from a secondary source different than the UAVs of the UAV service, wherein the reference aerial images have at least one style characteristic that is distinct from that of operational aerial images acquired by the UAVs of the UAV service during operations of the UAV service;

transforming the reference aerial images into training images that adopt an image style of the operational aerial images using a neural style transfer;

training a neural network that facilitates vision-based navigation of the UAVs using the training images; and provisioning the UAVs of the UAV service with the neural network trained to operate in the specific geographical region.

2. The method of claim 1, further comprising:

retraining the neural network with new aerial images of the specific geographical region acquired by one or more of the UAVs of the UAV service after an initial set of flight missions by the one or more of the UAVs of the UAV service.

3. The method of claim 1, wherein the neural network comprises a semantic segmentation model trained to identify at least one of buildings, roads, or trees in the operational aerial images acquired by the UAVs during the operations of the UAV service.

4. The method of claim 1, wherein the at least one style characteristic of the reference aerial images that is distinct from that of the operational aerial images includes at least one of a lens aberration characteristic, an image sensor noise characteristic, an exposure time characteristic, a motion blur characteristic, an altitude perspective characteristic, or an illumination pattern characteristic.

5. The method of claim 1, wherein the reference aerial images comprise satellite images or manned aircraft aerial images having roads, buildings, or trees annotated as ground truth data.

6. The method of claim 1, further comprising:

acquiring simulated sensor data of a simulated flight mission over the specific geographical region;

transforming the simulated sensor data into training sensor data that adopts a sensor style of a perception sensor onboard the UAVs using another neural style transfer; and training the neural network using the training sensor data.

7. The method of claim 6, wherein the simulated sensor data comprises at least one of a stereovision depth map or inertial measurement unit (IMU) data.

8. The method of claim 1, wherein the training comprises a refinement training of the neural network to optimize the neural network for the operations in the specific geographical region, the method further comprising:

comparing the neural network after the refinement training using the training images generated with the neural style transfer against the neural network prior to the refinement training; and when the neural network changes greater than a threshold amount during the refinement training, constraining the operations of the UAVs over the specific geographical region.

9. The method of claim 8, wherein constraining the operations of the UAVs over the specific geographical region comprises limiting reliance upon the neural network for vision-based navigation of the UAVs.

10. The method of claim 9, wherein limiting reliance upon the neural network comprises limiting reliance until primary source training data of the specific geographical region is acquired by the UAVs of the UAV service for further refinement training of the neural network.

11. The method of claim 1, wherein the operational aerial images comprise daytime operational images, the method further comprising:

transforming the daytime operational images into nighttime training images using a day-to-night neural style transfer; and training the neural network for nighttime operations of the UAVs over the specific geographical region using the nighttime training images.

12. At least one non-transitory machine-readable medium having instructions stored thereon that, in response to execution, cause a computing device to perform software operations for provisioning unmanned aerial vehicles (UAVs) of a UAV service to operate in a specific geographical region, the software operations comprising:

acquiring reference aerial images of the specific geographical region from a secondary source different than the UAVs of the UAV service, wherein the reference aerial images have at least one style characteristic that is distinct from that of operational aerial images acquired by the UAVs of the UAV service during UAV operations of the UAV service;

transforming the reference aerial images into training images that adopt an image style of the operational aerial images using a neural style transfer;

training a neural network that facilitates vision-based navigation of the UAVs using the training images; and provisioning the UAVs of the UAV service with the neural network trained to operate in the specific geographical region.

13. The at least one non-transitory machine-readable medium of claim 12, wherein the neural network comprises a semantic segmentation model trained to identify at least one of buildings, roads, or trees in the operational aerial images acquired by the UAVs during the UAV operations.

14. The at least one non-transitory machine-readable medium of claim 12, wherein the at least one style characteristic of the reference aerial images that is distinct from that of the operational aerial images includes at least one of a lens aberration characteristic, an image sensor noise characteristic, an exposure time characteristic, a motion blur characteristic, an altitude perspective characteristic, or an illumination pattern characteristic.

15. The at least one non-transitory machine-readable medium of claim 12, wherein the software operations further comprise:

acquiring simulated sensor data of a simulated flight mission over the specific geographical region;

transforming the simulated sensor data into training sensor data that adopts a sensor style of a perception sensor onboard the UAVs using another neural style transfer; and training the neural network using the training sensor data.

16. The at least one non-transitory machine-readable medium of claim 15, wherein the simulated sensor data comprises at least one of a stereovision depth map or inertial measurement unit (IMU) data.

17. The at least one non-transitory machine-readable medium of claim 12, wherein the training comprises a refinement training of the neural network to optimize the neural network for the UAV operations in the specific geographical region, the software operations further comprising:

comparing the neural network after the refinement training using the training images generated with the neural style transfer against the neural network prior to the refinement training; and if the neural network changes greater than a threshold amount during the refinement training, constraining the UAV operations over the specific geographical region.

18. The at least one non-transitory machine-readable medium of claim 17, wherein constraining the UAV operations over the specific geographical region comprises limiting reliance upon the neural network for vision-based navigation of the UAVs.

19. The at least one non-transitory machine-readable medium of claim 17, wherein limiting reliance upon the neural network comprises limiting the reliance until after primary source training data of the specific geographical region is acquired by the UAVs of the UAV service for further refinement training of the neural network.

20. The at least one non-transitory machine-readable medium of claim 12, wherein the operational aerial images comprise daytime operational images, the software operations further comprising:

transforming the daytime operational images into nighttime training images using a day-to-night neural style transfer; and training the neural network for nighttime operations of the UAVs over the specific geographical region using the nighttime training images.

21. The method of claim 1, wherein provisioning the UAVs of the UAV service with the neural network comprises provisioning the UAVs of the UAV service with the neural network trained to operate in the specific geographical region prior to commencement of the operations of the UAV service in the specific geographical region.

\* \* \* \* \*